United States Patent
Zhai et al.

(10) Patent No.: US 11,201,323 B2
(45) Date of Patent: Dec. 14, 2021

(54) MOS$_x$/CARBON BLACK NANOCOMPOSITE MATERIAL, AND MANUFACTURING METHOD AND APPLICATION THEREOF

(71) Applicant: PEKING UNIVERSITY, Beijin (CN)

(72) Inventors: Maolin Zhai, Beijing (CN); Pengfei Cao, Beijing (CN); Jing Peng, Beijing (CN); Jiuqiang Li, Beijing (CN)

(73) Assignee: Peking University, Beijing (CN)

( * ) Notice: Subject to any disclaimer, the term of this patent is extended or adjusted under 35 U.S.C. 154(b) by 385 days.

(21) Appl. No.: 16/320,444

(22) PCT Filed: Jul. 25, 2017

(86) PCT No.: PCT/CN2017/094308
§ 371 (c)(1),
(2) Date: Jan. 24, 2019

(87) PCT Pub. No.: WO2018/019231
PCT Pub. Date: Feb. 1, 2018

(65) Prior Publication Data
US 2019/0267620 A1    Aug. 29, 2019

(30) Foreign Application Priority Data
Jul. 27, 2016  (CN) .......................... 201610600245.7

(51) Int. Cl.
*H01M 4/02*      (2006.01)
*H01M 4/36*      (2006.01)
(Continued)

(52) U.S. Cl.
CPC ............ *H01M 4/366* (2013.01); *C01G 39/06* (2013.01); *C25B 1/04* (2013.01); *C25B 11/04* (2013.01);
(Continued)

(58) Field of Classification Search
CPC .... H01M 4/366; H01M 4/5818; H01M 4/583; H01M 8/0606; H01M 8/0656; H01M 8/22; H01M 2004/8689; H01M 2250/20
See application file for complete search history.

(56) References Cited

U.S. PATENT DOCUMENTS

2009/0081497 A1* 3/2009 Vu ..................... H01M 8/0656
429/436

FOREIGN PATENT DOCUMENTS

CN        102142537 A    8/2011
CN        103000887 A    3/2013
(Continued)

OTHER PUBLICATIONS

European Patent Office, Extended European Search Report issued in European Patent Application No. 17 83 3534 (dated Jun. 24, 2019).
(Continued)

*Primary Examiner* — Jane J Rhee
(74) *Attorney, Agent, or Firm* — Leydig, Voit & Mayer, Ltd.

(57) ABSTRACT

A MoS$_x$/carbon black nanocomposite material, and a manufacturing method and application thereof. In the MoS$_x$/carbon black nanocomposite material, $2 \leq x \leq 2.3$. The weight percentage of MoS$_x$ as part of the total weight of the nanocomposite material is 5-50%. The MoS$_x$/carbon black nanocomposite material has 20% higher performance when compared to a commercial 20% Pt/C catalyst. The manufactured MoS$_x$/carbon black nanocomposite material also has excellent catalytic stability. There is no significant decrease in catalytic performance of the material after 5,000 catalytic cycles.

19 Claims, 4 Drawing Sheets

(51) Int. Cl.
| | |
|---|---|
| C25B 1/04 | (2021.01) |
| C25B 11/04 | (2021.01) |
| H01M 4/58 | (2010.01) |
| H01M 4/583 | (2010.01) |
| H01M 8/0606 | (2016.01) |
| H01M 8/22 | (2006.01) |
| H01M 8/0656 | (2016.01) |
| C01G 39/06 | (2006.01) |
| H01M 4/86 | (2006.01) |

(52) U.S. Cl.
CPC ......... H01M 4/583 (2013.01); H01M 4/5815 (2013.01); H01M 8/0606 (2013.01); H01M 8/0656 (2013.01); H01M 8/22 (2013.01); H01M 2004/8689 (2013.01); H01M 2250/20 (2013.01)

(56) References Cited

FOREIGN PATENT DOCUMENTS

| | | | |
|---|---|---|---|
| CN | 104091936 A | | 10/2014 |
| CN | 104600315 A | | 5/2015 |
| CN | 105098151 A | | 11/2015 |
| CN | 105174311 A | | 12/2015 |
| CN | 105200450 A | * | 12/2015 |
| CN | 105200450 A | | 12/2015 |
| CN | 106960948 A | | 7/2017 |
| JP | 2009-082910 A | | 4/2009 |
| JP | 2012-119078 A | | 6/2012 |
| JP | 2015-142882 A | | 8/2015 |
| KR | 20140008205 A | | 1/2014 |

OTHER PUBLICATIONS

Nikam et al., "Three-Dimensional Heterostructures of MoS₂ Nanosheets on Conducting MoO₂ as an Efficient Electrocatalyst To Enhance Hydrogen Evolution Reaction," *ACS Appl. Mater. Interfaces* 7: 23328-23335 (2015).
Xie et al., "Vertically aligned oxygen-doped molybdenum disulfide nanosheets grown on carbon cloth realizing robust hydrogen evolution reaction," *Inorg. Chem. Front.* 3(19): 1160-1166 (2016).
Yang et al., "Preparation of layered MoS₂/Graphene films and their electrocatalytic performance of hydrogen generation," *Journal of Beijing University of Aeronautics and Astronautics* 41(11): 2158-2165 (2015).
State Intellectual Property Office of the People's Republic of China, International Search Report in International Application No. PCT/CN2017/094308 (dated Dec. 7, 2017).
State Intellectual Property Office of the People's Republic of China, Written Opinion in International Application No. PCT/CN2017/094308 (dated Dec. 7, 2017).
International Bureau of WIPO, International Preliminary Report on Patentability in International Application No. PCT/CN2017/094308 (dated Jan. 29, 2019).
State Intellectual Property Office of the People's Republic of China, International Search Report in International Application No. PCT/CN2017/094333 (dated Nov. 1, 2017).
State Intellectual Property Office of the People's Republic of China, Written Opinion in International Application No. PCT/CN2017/094333 (dated Nov. 1, 2017).
International Bureau of WIPO, International Preliminary Report on Patentability in International Application No. PCT/CN2017/094333 (dated Jan. 29, 2019).
Corrales-Sanchez et al., "MoS₂-based materials as alternative cathode catalyst for PEM electrolysis," *International Journal of Hydrogen Energy* 39(35): 20837-20843 (2014).
Li et al., "Ball-milling MoS₂/carbon black hybrid material for catalyzing hydrogen evolution reaction in acidic medium," *Journal of Energy Chemistry* 24(5): 608-613 (2015).
Japan Patent Office, Notice of Reasons for Refusal in Japanese Patent Application No. 2019-503983 (dated Feb. 4, 2020).
U.S. Appl. No. 16/320,450, filed Jan. 24, 2019.
Benck et al., "Amorphous Molybdenum Sulfide Catalysts for Electrochemical Hydrogen Production: Insights into the Origin of their Catalytic Activity," *ACS Catalysis* 2(9): 1916-1923 (2012).
Benck et al., "Amorphous Molybdenum Sulfide Catalysts for Electrochemical Hydrogen Production: Insights into the Origin of their Catalytic Activity," Supporting Materials, 22 pages (2012).
Benson et al., "Electrocatalytic Hydrogen Evolution Reaction on Edges of a Few Layer Molybdenum Disulfide Nanodots," *ACS Applied Materials & Interfaces* 7(25): 14113-14122 (2015).
Bindumadhavan et al., "MoS₂-MWCNT hybrids as a superior anode in lithium-ion batteries," *Chem. Commun.* 49:1823-1825 (2013).
Guo et al., "Hollow Structured Micro/Nano MoS₂ Spheres for High Electrocatalytic Activity Hydrogen Evolution Reaction," *ACS Applied Materials & Interfaces* 8(8): 5517-5525(2016).
Hinnemann et al., "Biomimetic Hydrogen Evolution: MoS₂ Nanoparticles as Catalyst for Hydrogen Evolution," *J. Am. Chem. Soc.* 127(15): 5308-5309 (2005).
Hinnemann et al., "Biomimetic Hydrogen Evolution: MoS₂ Nanoparticles as Catalyst for Hydrogen Evolution," Supporting Materials, pp. S1-S5 (2005).
Kibsgaard et al., "Engineering the surface structure of MoS₂ to preferentially expose active edge sites for electrocatalysis," *Nature Materials* 11(11): 963-969 (2012).
Li et al., "MoS₂ Nanoparticles Grown on Graphene: An Advanced Catalyst for the Hydrogen Evolution Reaction," *J. Am. Chem. Soc.* 133(19): 7296-7299 (2011).
Li et al., "Selective hydrodesulfurization of gasoline on C0/MoS₂ ±x catalyst: Effect of sulfur defects in MoS₂ ± x," *Applied Catalysis A: General* 524: 66-76 (2016).
Lukowski et al., "Enhanced Hydrogen Evolution Catalysis from Chemically Exfoliated Metallic MoS₂ Nanosheets," *Journal of the American Chemical Society* 135(28): 10274-10277 (2013).
Lukowski et al., "Enhanced Hydrogen Evolution Catalysis from Chemically Exfoliated Metallic MoS₂ Nanosheets," Supporting Information, *Journal of the American Chemical Society* 135(28): S1-S16 (2013).
Shi et al., "Hot Electron of Au Nanorods Activates the Electrocatalysis of Hydrogen Evolution on MoS₂ Nanosheets," *Journal of the American Chemical Society* 137(23): 7365-7370 (2015).
Shi et al., "Hot Electron of Au Nanorods Activates the Electrocatalysis of Hydrogen Evolution on MoS₂ Nanosheets,"Supporting Information *Journal of the American Chemical Society*, 14 pgs. (2015).
Wang et al., "Enhanced electrocatalytic activity for hydrogen evolution reaction from self-assembled monodispersed molybdenum sulfide nanoparticles on an Au electrode," *Energy & Environmental Science* 6(2): 625-633 (2013).
Xie et al., "Defect-rich MoS₂ ultrathin nanosheets with additional active edge sites for enhanced electrocatalytic hydrogen evolution," *Advanced Materials* 25(40): 5807-5813 (2013).
Zhao et al., "MoS₂ Nanosheets Supported on 3D Graphene Aerogel as a Highly Efficient Catalyst for Hydrogen Evolution," *Chemistry—A European Journal* 21(45): 15908-15913 (2015).
Zheng et al., "Space-Confined Growth of MoS₂ Nanosheets within Graphite: The Layered Hybrid of MoS₂ and Graphene as an Active Catalyst for Hydrogen Evolution Reaction," *Chemistry of Materials* 26(7): 2344-2353 (2014).
Zheng et al., "Space-Confined Growth of MoS₂ Nanosheets within Graphite: The Layered Hybrid of MoS₂ and Graphene as an Active Catalyst for Hydrogen Evolution Reaction," Supporting Information *Chemistry of Materials*, 5 pgs. (2014).

* cited by examiner

MOS$_x$/CARBON BLACK NANOCOMPOSITE MATERIAL, AND MANUFACTURING METHOD AND APPLICATION THEREOF

The present application is the U.S. national phase of International Application No. PCT/CN2017/094308, filed on Jul. 25, 2017, which claims the priority of the Chinese patent application No. 201610600245.7 with the title of "MoS$_x$/CARBON BLACK NANOCOMPOSITE MATERIAL, AND MANUFACTURING METHOD AND APPLICATION THEREOF", filed before the SIPO on Jul. 27, 2016, the disclosures of which are incorporated herein by reference in their entireties for all purposes.

FIELD OF THE INVENTION

The present application relates to the field of composite material, and particularly to a MoS$_x$/carbon black nanocomposite material, manufacturing method and application thereof.

BACKGROUND OF THE INVENTION

Hydrogen, as a clean new energy source, has great significance for environmental protection and energy security. How to produce hydrogen on a large scale is a fundamental problem for the commercial use of hydrogen energy. Hydrogen Evolution Reaction (HER) is considered as a feasible solution for a large-scale production of hydrogen, but the reaction has a higher cathode overpotential on the cathode, resulting in a significant increase in the energy costs for hydrogen preparation. Platinum-based noble metal, as a catalyst for this reaction, can well reduce the cathode overpotential, but it cannot meet the requirements of large-scale applications due to the limited reserves of platinum-based noble metals on the earth. Therefore, it becomes the researchers' focus for seeking alternative catalytic materials to reduce the cathode overpotential so as to reduce the production costs.

Molybdenum disulfide is a compound with a layered structure similar to graphite. A molybdenum disulfide bulk, when used as a catalyst for HER, results in a relatively high overpotential. The physicochemical properties of the molybdenum disulfide will change significantly, when layers of the bulk are reduced to few-layer or even a monolayer. Through theoretical calculation, the researchers demonstrated that the molybdenum disulfide material with few-layer has better HER catalytic activity (Berit H., Poul G M., Bonde, K. P. Jorgensen, J. Nielsen, S. Chorkendorff, J. K Norskov *Journal of the American Chemistry Society* 2005, 127, 5308-5309). Molybdenum disulfide based nanocomposite materials have been currently reported in many literatures (a, Li Y, Wang H., Xie L, Liang Y, Hong G, Dai H., *Journal of the American Chemistry Society* 2011, 133, 7296-7299; b, Bindumadhavan K., Srivasata S. K., Mahanty S. *Chemical Communications* 2013, 49, (18), 1823-1825) and patents (for example, Chinese Patent of Invention ZL 201210326035.5). However, in these current studies, the preparation methods for nanocomposite materials are generally very complicated, and organic solvents are often used. In addition, the catalytic performance is still far behind that of platinum-based noble metal catalysts.

SUMMARY OF THE INVENTION

The examples of the present application disclose a MoS$_x$/carbon black nanocomposite material (Mo represents element molybdenum, and S represents element sulfur), manufacturing method and application thereof, so as to solve the problem that the catalytic performance of the current MoS$_2$ based nanocomposite material is still far behind that of platinum-based noble metal catalysts (for example, the commercial 20% Pt/C catalyst). The technical solutions are as follows:

A first aspect of the present application provides a MoS$_x$/carbon black nanocomposite material, wherein $2 \leq x \leq 2.3$, and MoS$_x$ represents 5-50% in mass based on the total mass of the nanocomposite material.

In a preferred embodiment of the first aspect of the present application, in the nanocomposite material, MoS$_x$ as a layered structure is dispersed in carbon black, and MoS$_x$ comprised in an aggregate formed by the layered structure has 10 layers or less, preferably 8 layers or less.

In a preferred embodiment of the first aspect of the present application, wherein $2.01 \leq x \leq 2.20$.

In a preferred embodiment of the first aspect of the present application, MoS$_x$ comprises both a 1T structure and a 2H structure. Preferably, 40-60% of MoS$_x$ has the 1T structure.

A second aspect of the present application provides a method for preparing the nanocomposite material mentioned above, wherein the method comprises:
(1) dispersing carbon black in water, preferably dispersing by sonication for 10-30 minutes, to obtain a carbon black dispersion;
(2) adding a sulfur source and a molybdenum source to the carbon black dispersion to obtain a mixed solution; and
(3) subjecting the mixed solution to a hydrothermal reaction at a temperature of 180-240° C. for 15-30 hours; and then obtaining the nanocomposite material by separation and drying after completion of the reaction.

In a preferred embodiment of the second aspect of the present application, the sulfur source and the molybdenum source come from the same compound, and the compound is present in the mixed solution at a concentration of 1-10 mg/mL. Preferably, the compound is at least one selected from the group consisting of ammonium tetrathiomolybdate and sodium tetrathiomolybdate.

In a preferred embodiment of the second aspect of the present application, the sulfur source and the molybdenum source come from the different compounds. The sulfur source is present in the mixed solution at a concentration of 2-40 mg/mL, and the molybdenum source is present in the mixed solution at a concentration of 1-10 mg/mL.

In a preferred embodiment of the second aspect of the present application, the sulfur source is at least one selected from the group consisting of thiourea and sodium thiosulfate; and the molybdenum source is at least one selected from the group consisting of ammonium molybdate, molybdenum pentachloride and sodium molybdate.

In a preferred embodiment of the second aspect of the present application, the ratio of carbon black to water is 1-16 mg:1 mL. The carbon black is at least one selected from the group consisting of acetylene black, Cabot carbon black, and Ketjen black, preferably at least one selected from the group consisting of Cabot carbon black XC-72, Cabot carbon black XC-72R and Cabot carbon black BP-2000.

A third aspect of the present application provides the use of the MoS$_x$/carbon black nanocomposite material mentioned above in an electrochemical hydrogen evolution reaction.

A fourth aspect of the present application provides a cathode electrode comprising a base electrode and the MoS$_x$/carbon black nanocomposite material coated on the surface of the base electrode. The base electrode is an inert electrode, and is preferably selected from the group consisting of a gold electrode, a platinum electrode, a glassy carbon electrode, a graphite electrode, an ITO electrode, or an FTO electrode.

A fifth aspect of the present application provides a device of hydrogen production by water electrolysis comprising the cathode electrode mentioned above.

A sixth aspect of the present application provides a hydrogen fuel cell apparatus comprising a hydrogen fuel cell and the device of hydrogen production by water electrolysis mentioned above.

A seventh aspect of the present application provides an electric equipment comprising the hydrogen fuel cell apparatus mentioned above. The electric equipment is preferably an electric vehicle, an electric tricycle and an electric bicycle.

The beneficial effects of the present application are as follows:

(1) In the present application, a highly conductive carbon black material is used as the carbon source of the composite material, and the $MoS_x$/carbon black nanocomposite material is prepared by hydrothermal method. The carbon black material can enhance the electrical conductivity of the $MoS_x$/carbon black nanocomposite on the one hand, and can reduce the aggregation of $MoS_x$ sheets, thereby increasing the number of catalytic active sites of $MoS_x$ on the other hand. In addition, the electronic effect between the carbon black material and the $MoS_x$ material can increase the intrinsic catalytic performance of $MoS_x$. Meanwhile, the carbon black material forms a three-dimensional network structure, which is beneficial to the sufficient contact between the electrolyte and the nanocomposite material. Therefore, the $MoS_x$/carbon black nanocomposite material prepared by the present application has better catalytic performance for electrocatalytic hydrogen evolution reaction than other catalysts containing molybdenum disulfide. By using the $MoS_x$/carbon black nanocomposite material prepared by the present application as a catalyst for the electrocatalytic hydrogen evolution reaction, when the overpotential is 300 mV, the current density can reach 300 mA/cm$^2$ or more, and up to a maximum of 465 mA/cm$^2$. By using a commercial 20% Pt/C catalyst in the electrocatalytic hydrogen evolution reaction, when the overpotential is 300 mV, the current density is only 370 mA/cm$^2$. Compared with the commercial 20% Pt/C catalyst, the $MoS_x$/carbon black nanocomposite material prepared by the present application has an equivalent performance or even a performance increased by about 20%, and has a good catalytic stability. There is no significant decrease in catalytic performance after 5,000 catalytic cycles.

(2) Compared with the traditional chemical vapor deposition or solvothermal method, the hydrothermal method has the advantages of simple preparation devices, mild reaction conditions, without using organic solvent, low environmental pollution, simple operation, good repeatability, low energy consumption, good applicability, availability in large-scale preparation, and good industrial prospects.

DESCRIPTION OF THE DRAWINGS

In order to illustrate the examples of the present application and the technical solutions of the prior art more clearly, the drawings used in the examples and the prior art will be briefly described. It is apparent that the drawings in the following description are only some examples of the present application. Those skilled in the art can obtain other drawings based on these drawings without inventive efforts.

DETAILED DESCRIPTION OF THE INVENTION

Figure 1:
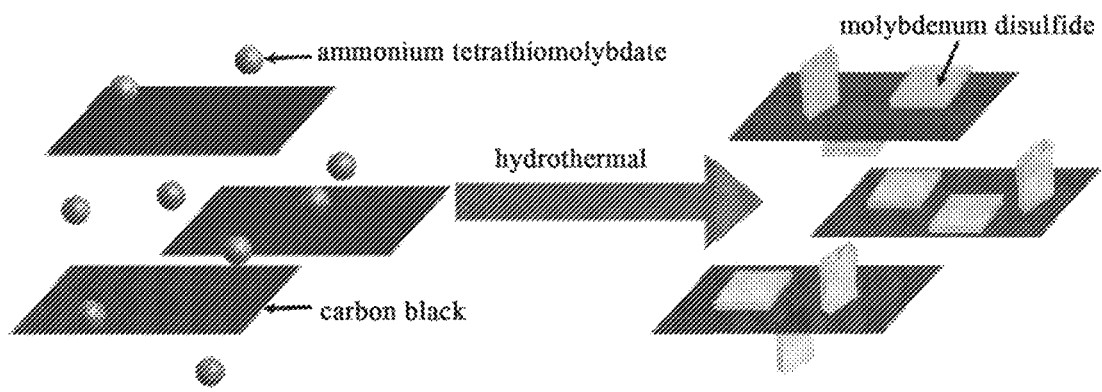
FIG. 1 is a schematic view showing the principle and process of preparing the $MoS_x$/carbon black nanocomposite material according to Example 1.

The present application firstly provides a $MoS_x$/carbon black nanocomposite material, wherein 2≤x≤2.3, and $MoS_x$ has a mass percentage of 5-50% based on the total mass of the nanocomposite material. In a particular embodiment of the present application, $MoS_x$ is dispersed in carbon black as a layered structure, and $MoS_x$ comprised in an aggregate formed by the layered structure has 10 layers or less, preferably 8 layers or less. The fewer layers exist, the more dispersed $MoS_x$ is relative to the carbon black, and the more $MoS_x$ catalytic active sites will be. In a particular embodiment of the present application, $MoS_x$ is molybdenum-deficient (also referred to as sulfur excessive) molybdenum disulfide ($MoS_2$), that is, an atomic ratio of sulfur to molybdenum is greater than 2, preferably, 2.01≤x≤2.20. $MoS_x$ has the same structural characteristics with $MoS_2$, and some defect sites which are formed due to molybdenum deficiency (or sulfur excess).

According to the previous description of the structure of $MoS_x$/carbon black nanocomposite materials, when characterizing the $MoS_x$/carbon black nanocomposite materials, it is sufficient to prove that the nanocomposite materials comprise $MoS_x$ as long as they have the structural characteristics of $MoS_2$.

The inventor has surprisingly discovered that the defect site formed in the structure of $MoS_x$ due to molybdenum deficiency can act as an active center of the catalytic reaction, thereby increasing the catalytic activity. In a particular embodiment of the present application, $MoS_x$ contains both a 1T structure and a 2H structure, with 1T structure being 40-60% and 2H structure being 60-40%. The inventor found that when 40-60% of $MoS_x$ is 1T structure, the $MoS_x$/carbon black nanocomposite material has a better conductivity.

The present application also provides a method for preparing the nanocomposite material mentioned above, wherein the method comprises:

(1) dispersing carbon black in water, preferably dispersing by sonication for 10-30 minutes, to obtain a carbon black dispersion;

wherein, in a particular embodiment of the present application, the ratio of carbon black to water is preferably 1-16 mg: 1 mL; the carbon black is at least one selected from the group consisting of acetylene black, Cabot carbon black and Ketjen black, preferably at least one selected from the group consisting of Cabot carbon black XC-72, Cabot carbon black XC-72R and Cabot carbon black BP-2000; the higher conductivity of the carbon black, the better conductivity of the $MoS_x$/carbon black nanocomposite material prepared; and in a particular embodiment, the power of sonication can be 500-1200 W;

(2) adding a sulfur source and a molybdenum source to the carbon black dispersion to obtain a mixed solution;

wherein, in a particular embodiment, the sulfur source and the molybdenum source come from the same compound, or different compounds; when the sulfur source and the molybdenum source come from the same compound, the compound contains both sulfur and molybdenum, for example, the compound can be ammonium tetrathiomolybdate or sodium tetrathiomolybdate, or a combination thereof; in a particular embodiment, the compound containing both sulfur and molybdenum is present in the mixed solution at a concentration of 1-10 mg/mL; when the sulfur source and the molybdenum source come from the different compounds, for example, the sulfur source comprises but not limited to at least one of thiourea and sodium thiosulfate, and it is present in the mixed solution at a concentration of 2-40 mg/mL; and the molybdenum source comprises but not limited to at least one of ammonium molybdate, molybdenum pentachloride, and sodium molybdate, and it is present in the mixed solution at a concentration of 1-10 mg/mL; and (3) subjecting the mixed solution to a hydrothermal reaction at a temperature of 180-240° C. for 15-30 hours; and then obtaining the nanocomposite material by separation and drying after completion of the reaction;

wherein, in a particular embodiment, the mixed solution obtained in step (2) can be transferred into a hydrothermal stainless steel kettle lined with polytetrafluoroethylene, reacted in a blast oven at 180-240° C. for 15-30 hours, naturally cooled after the oven is closed, then filtered, washed with deionized water and then dried to obtain a $MoS_x$/carbon black nanocomposite material; wherein the separation may also be carried out by centrifugation or the like in addition to filtration; and the drying may be carried out at a temperature of 30-60° C. for 12-24 hours.

The present application also provides application of the $MoS_x$/carbon black nanocomposite material mentioned above in the electrochemical hydrogen evolution reaction. Specifically, the $MoS_x$/carbon black nanocomposite material can be used as a catalyst for the electrochemical hydrogen evolution reaction.

The present application also provides a cathode electrode for electrolyzing water to produce hydrogen (which is an electrochemical hydrogen evolution reaction), wherein the cathode electrode comprises a base electrode and the $MoS_x$/carbon black nanocomposite material coated on the surface of the base electrode. The base electrode is an inert electrode. In a particular embodiment, the base electrode can be an inert electrode, such as a gold electrode, a platinum electrode, a glassy carbon electrode, a graphite electrode, an ITO electrode, or an FTO electrode.

The cathode electrode can be obtained by the following method: firstly dissolving a $MoS_x$/carbon black nanocomposite material and a film-forming agent (for example, a Nafion film solution) in a solvent, dispersing uniformly to obtain a catalyst solution; and then coating the catalyst solution onto the surface of the inert electrode and drying.

The present application further provides a device of hydrogen production by water electrolysis, wherein the device comprises the cathode electrode provided by the present application. It should be noted that, the device of hydrogen production by water electrolysis provided by the present application employs the cathode electrode provided by the present application. The other components required for the device of hydrogen production by water electrolysis, such as anode electrode, electrolytic cell, electrolyte and the like can be implemented by the related technical solutions in the prior art, which are not defined herein.

The present application also provides a hydrogen fuel cell device, wherein the hydrogen fuel cell device comprises a hydrogen fuel cell and the device of hydrogen production by water electrolysis provided by the present application for supplying hydrogen gas to the hydrogen fuel cell. The structure and preparation process of the hydrogen fuel cell belong to the prior art. In a particular embodiment, any hydrogen fuel cell in the prior art can be used as the hydrogen fuel cell in the present application. The hydrogen fuel cell is connected to the device of hydrogen production by water electrolysis provided by the present application, which is used for supplying hydrogen gas to the hydrogen fuel cell. The device of hydrogen production by water electrolysis can be connected to the hydrogen fuel cell by using the related technical solutions in the prior art, which are not defined herein.

The present application also provides an electric equipment comprising the hydrogen fuel cell device provided by the present application. The other parts of the electric equipment in addition to the hydrogen fuel cell device, can be implemented by the related technical solutions in the prior art, which are not defined herein. In the present application, the electric equipment includes but not limited to an electric vehicle, an electric tricycle, or an electric bicycle.

In order to illustrate the objects, the technical solutions, and the advantages of the present application more clearly, the present application will be further described in detail below with reference to the drawings and examples. It is apparent that the described examples are only a part of the examples of the present application, not all of examples. All other examples obtained by the ordinary skilled in the art without creative work based on the examples of the present application are within the scope of the present application.

The experimental methods described in the following examples, unless otherwise specified, are conventional methods. The reagents and materials, unless otherwise specified, are commercially available.

Example 1: Preparation and Application of $MoS_x$/Carbon Black Nanocomposite Material Preparation of $MoS_x$/Carbon Black Nanocomposite Material 200 mg acetylene black was dispersed into 50 mL deionized water (4 mg/mL), and ultrasonically dispersed for 10 minutes with an ultrasonic processor (at an ultrasonic power of 650 W) at room temperature to obtain an acetylene black dispersion. Then, 200 mg ammonium tetrathiomolybdate was added to obtain a mixed solution. The mixed solution was transferred to a 100 mL hydrothermal reactor lined with polytetrafluoroethylene, placed into a blast oven preheated to 220° C. and reacted for 24 hours. After completion of the reaction, the oven was closed and naturally cooled. The product was filtered, washed with deionized water, dried in a vacuum oven at 40° C. for 12 hours to obtain powdery $MoS_x$/carbon black nanocomposite materials. The preparation process and principle are shown in FIG. 1.

Figure 2:
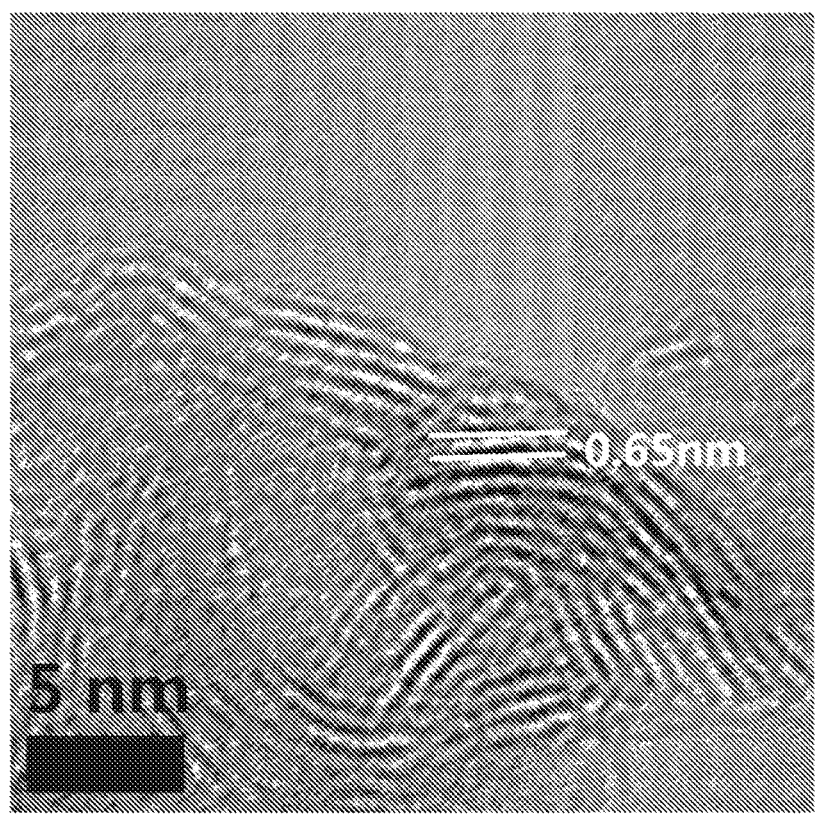
FIG. 2 is a transmission electron microscope (TEM) image of the $MoS_x$/carbon black nanocomposite material prepared in Example 1.

TEM characterization was performed for the prepared $MoS_x$/carbon black nanocomposite material. The result of which is shown in FIG. 2. It can be seen from FIG. 2 that after hydrothermal reaction, an ordered $MoS_2$ layered structure was formed with a layer spacing of 0.65 nm, a typical layer spacing of $MoS_2$. It proves that $MoS_2$ structure is actually formed after the hydrothermal reaction. Further, it can be seen from FIG. 2 that the $MoS_2$ structure has fewer layers, i.e., 3-8 layers. In addition, it can be seen from FIG. 2 that $MoS_x$ is dispersed in carbon black on a nanometer scale to form a nanocomposite material.

Figure 3:
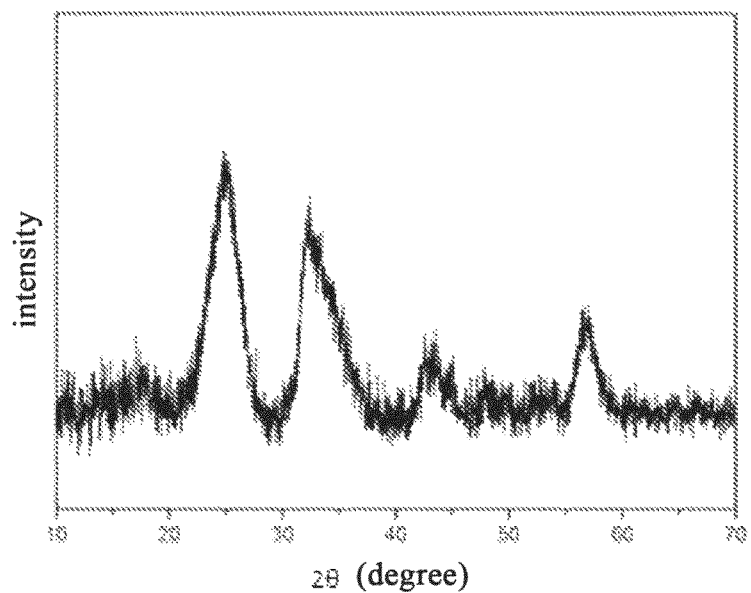
FIG. 3 is an X-ray diffraction (XRD) pattern of the $MoS_x$/carbon black nanocomposite material prepared in Example 1.

XRD characterization was performed for the prepared $MoS_x$/carbon black nanocomposite material, which further verified the structure of $MoS_2$ in the resulting nanocomposite material. The result is shown in FIG. 3. In FIG. 3, the broadening peak at 2θ of about 240 is the (002) diffraction peak of acetylene black, the small peak at 2θ of 43° is the (100) diffraction peak of acetylene black, and the diffraction peaks at 2θ of 33° and 57° correspond to the (100) and (110) diffraction peaks of $MoS_2$, respectively. Therefore, the formation of $MoS_2$ structure is verified. Meanwhile, the absence of the diffraction peak of $MoS_2$ (002) at 14° indicates that $MoS_2$ structure generated has fewer layers, and the ordered structure between layers is destroyed. Such structure is beneficial for increasing the number of catalytic sites of $MoS_x$.

Figure 4A:
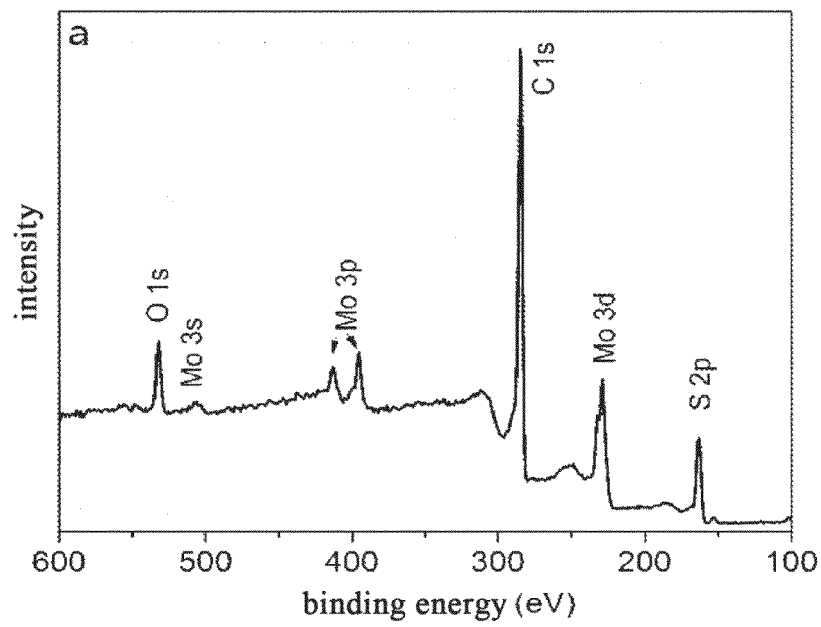
FIG. 4A is a full spectrum of X-ray photoelectron spectroscopy (XPS) of the $MoS_x$/carbon black nanocomposite material prepared in Example 1.
Figure 4B:
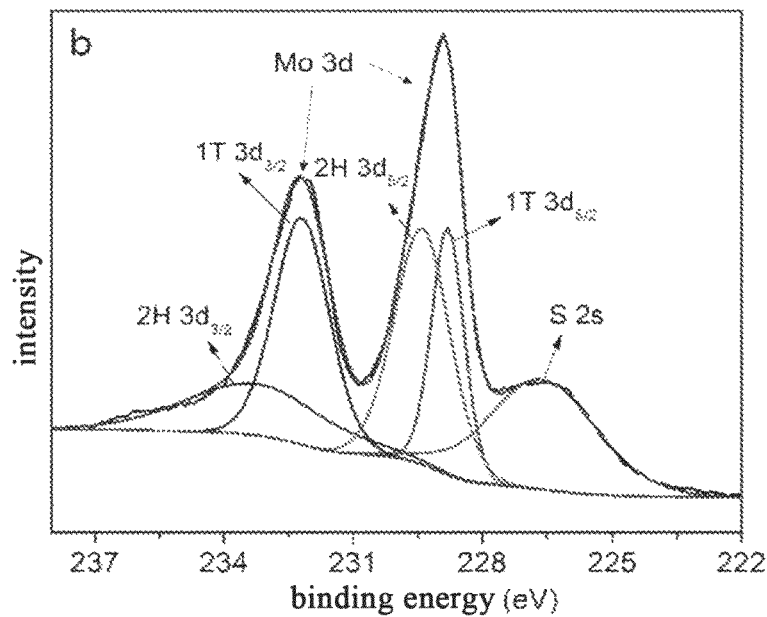
FIG. 4B is an XPS high resolution diagram of $Mo^{4+}$.

XPS characterization was performed for the prepared $MoS_x$/carbon black nanocomposite material to determine other composition and structural information of $MoS_x$. The results are shown in FIG. 4A and FIG. 4B. According to the XPS full spectrum analysis of FIG. 4A, it can be known that the atomic ratio of Mo to S is 1:2.10 in the nanocomposite material. The excess of S atoms indicates that $MoS_x$ has defect sites compared with $MoS_2$, and these defect sites can serve as active sites of catalytic reactions, thereby increasing catalytic activity. In the high resolution diagram of $Mo^{4+}$ in FIG. 4B, two pairs of double peaks can be observed. The double peaks with a binding energy at 229.2 eV and 232.3 eV are Mo $3_{d5/2}$ and $3_{d3/2}$ peaks of 2H structure, while the double peaks with a binding energy at 228.6 eV and 231.8 eV are Mo $3_{d5/2}$ and $3_{d3/2}$ peaks of 1T structure, respectively. It indicates that the generated $MoS_x$ is of 1T@2H structure (i.e., containing both 1T structure and 2H structure). The content of the 1T structure component in $MoS_x$ is determined to be about 50% by integrating the corresponding peak areas.

The mass percentage of $MoS_x$ in the $MoS_x$/carbon black nanocomposite material is determined to be about 25% by element analysis.

Figure 5:
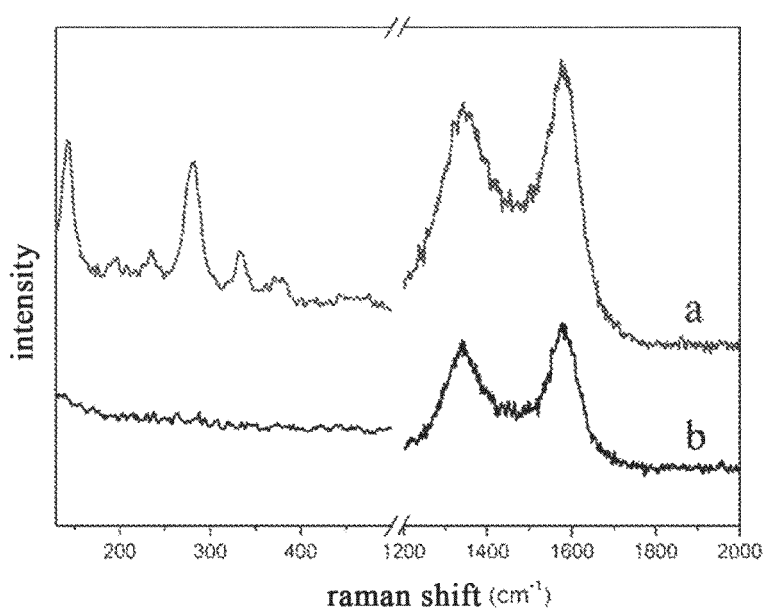
FIG. 5 is a Raman spectrum diagram of the $MoS_x$/carbon black nanocomposite material prepared in Example 1 and acetylene black, wherein curve a is a Raman diagram of the $MoS_x$/carbon black nanocomposite material prepared in Example 1, and curve b is a Raman diagram of acetylene black.

Raman spectrum analysis was performed for the prepared $MoS_x$/carbon black nanocomposite material. The result is shown in FIG. 5. As can be seen from FIG. 5, the Raman signals at 283 $cm^{-1}$ and 381 $cm^{-1}$ are the vibration peak of the $MoS_x$ with 2H structure, and the Raman signals at 149 $cm^{-1}$ and 327 $cm^{-1}$ are the vibration peaks of the $MoS_x$ with 1T structure. It is also confirmed by Raman spectrum that the generated $MoS_x$ is a 1T@2H structure.

Catalytic performance test of $MoS_x$/carbon black nanocomposite material

The performance for electrocatalytic hydrogen evolution reaction of the prepared $MoS_x$/carbon black nanocomposite material was tested by a three-electrode system. A saturated calomel electrode (SCE) was used as a reference electrode, a 1 $cm^2$ Pt electrode was used as a counter electrode, and a glassy carbon electrode coated with the $MoS_2$/carbon black nanocomposite material was used as a working electrode, with 0.5 M $H_2SO_4$ as electrolyte. The Shanghai Chenhua's CHI 760e electrochemical workstation was used for testing.

The working electrode was prepared by drop casting. Specifically, 4 mg $MoS_x$/carbon black nanocomposite material was weighed and dispersed in a 1 mL mixed solvent of ultrapure water/ethanol ($V_{water}:V_{ethanol}$=4:1), then added with 40 μL 5% Nafion film solution, and ultrasonically dispersed for more than 30 minutes with an ultrasonic processor at room temperature to obtain a uniform catalyst solution. 3, 5, 7, and 9 μL of the catalyst solution was drop cast on the surface of an L-type glassy carbon electrode having a diameter of 3 mm which has been polished. The working electrode with a catalyst loading of 0.165, 0.275, 0.385, and 0.495 mg/$cm^2$ was formed after the surface was completely dried, and was used for linear sweep voltammetry (LSV). The test results are shown in FIG. 6 and FIG. 7.

Testing parameters: the linear sweep voltammetry (LSV) has a sweep rate of 5 mV/s and a sweep range of 0.2 to −0.4 V (relative to the reversible hydrogen electrode (RHE)). The cyclic voltammetry test has a sweep rate of 50 mV/s and a sweep range of 0 to −0.3 V (relative to RHE).

Figure 6:
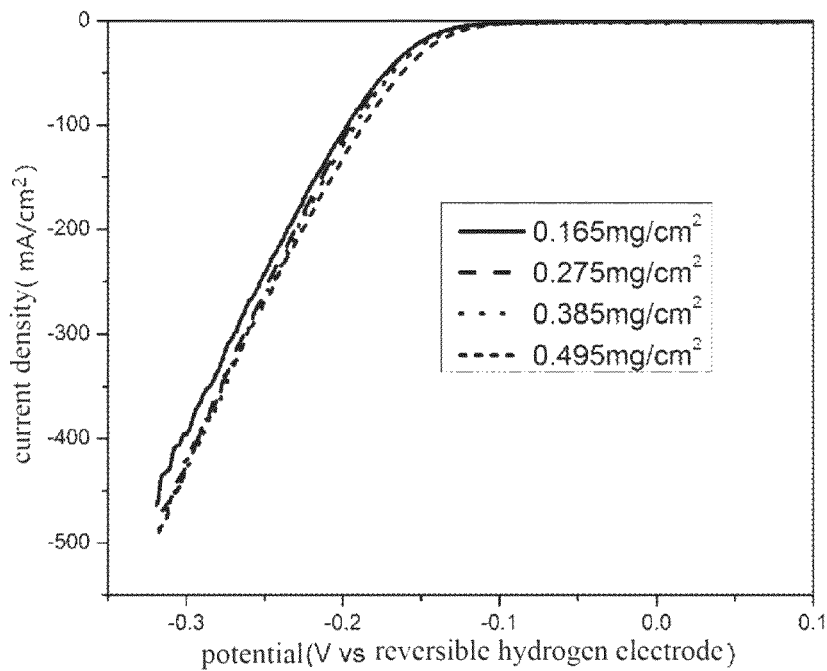
FIG. 6 is a linear sweep voltammetry (LSV) test diagram of the $MoS_x$/carbon black nanocomposite material prepared in Example 1 on a glassy carbon electrode at different loadings.

As can be seen from FIG. 6, when the overpotential is 300 mV, the current density can reach 451 mA/$cm^2$. Those skilled in the art know that in case that the commercial 20% Pt/C catalyst is used for electrocatalytic hydrogen evolution reaction, the current density is only 370 mA/$cm^2$ when the overpotential is 300 mV It can be seen that the $MoS_x$/carbon black nanocomposite material provided by this example has much better catalytic performance than the commercial 20% Pt/C catalyst. Moreover, it can be seen from FIG. 6 that the loading of the catalyst substantially has no effect on the catalytic performance, indicating that the $MoS_x$/C nanocomposite material has excellent catalytic performance as a catalyst.

Figure 7:
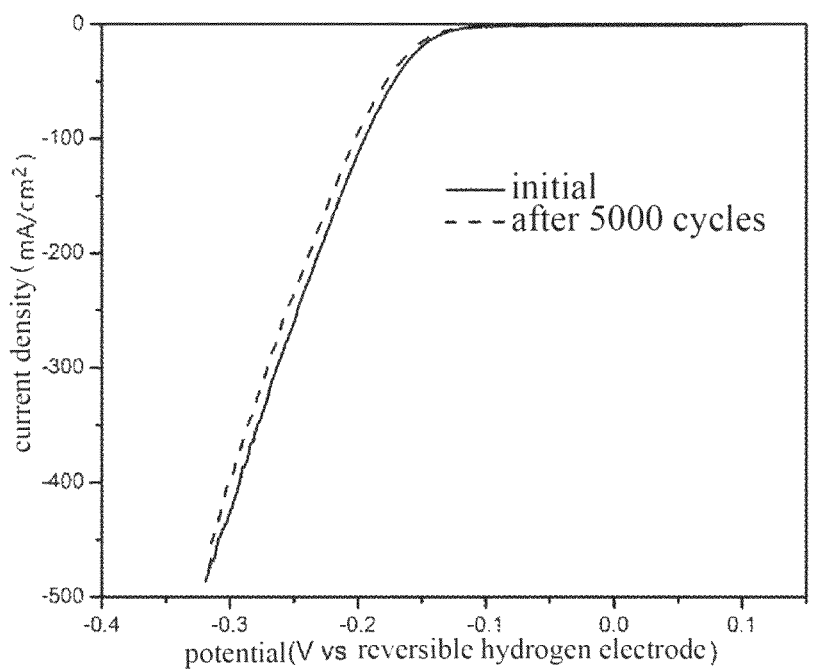
FIG. 7 is a linear sweep voltammetry (LSV) test diagram of the $MoS_x$/carbon black nanocomposite material prepared in Example 1 after catalytic cycles.

FIG. 7 is a linear sweep voltammetry (LSV) diagram of the $MoS_x$/carbon black nanocomposite material after catalytic cycles. As can be seen from FIG. 7, the $MoS_2$/carbon black nanocomposite material has very good catalytic stability. There is substantially no change in current density at the overpotential of 320 mV after 5,000 catalytic cycles.

Example 2: Preparation of $MoS_x$/Carbon Black Nanocomposite Material

The $MoS_x$/carbon black nanocomposite material was prepared under the conditions of Example 1 except that acetylene black in Example 1 was replaced by Cabot carbon black XC-72. The mass percentage of $MoS_x$ was about 25%, the content of 1T component was about 50%, and atomic ratio of Mo to S is 1:2.11.

Example 3: Preparation of $MoS_x$/Carbon Black Nanocomposite Material

The $MoS_x$/carbon black nanocomposite material was prepared under the conditions of Example 1 except that acetylene black in Example 1 was replaced by Cabot carbon black XC-72R. The mass percentage of $MoS_x$ was about 25%, content of 1T component was about 50%, and atomic ratio of Mo to S is 1:2.10.

Example 4: Preparation of $MoS_x$/Carbon Black Nanocomposite Material

The $MoS_x$/carbon black nanocomposite material was prepared under the conditions of Example 1 except that acetylene black in Example 1 was replaced by Cabot carbon black BP-2000. The mass percentage of $MoS_x$ was about 25%, the content of 1T component was about 50%, and atomic ratio of Mo to S is 1:2.11.

Example 5: Preparation of $MoS_x$/Carbon Black Nanocomposite Material

The $MoS_x$/carbon black nanocomposite material was prepared under the conditions of Example 1 except that acetylene black in Example 1 was replaced by Ketjen black. The mass percentage of $MoS_x$ was about 25%, the content of 1T component was about 50%, and atomic ratio of Mo to S is 1:2.09.

Example 6: Preparation of $MoS_x$/Carbon Black Nanocomposite Material

The $MoS_x$/C nanocomposite material was prepared under the conditions of Example 1 except that the mass of acetylene black in Example 1 was altered to 400 mg. The mass percentage of $MoS_x$ was about 13%, the content of 1T component was about 50%, and atomic ratio of Mo to S is 1:2.10.

Example 7: Preparation of $MoS_x$/Carbon Black Nanocomposite Material

The $MoS_x$/carbon black nanocomposite material was prepared under the conditions of Example 1 except that the mass of acetylene black in Example 1 was altered to 800 mg. The mass percentage of $MoS_x$ was about 6%, the content of 1T component was about 50%, and atomic ratio of Mo to S is 1:2.10.

Example 8: Preparation of $MoS_x$/Carbon Black Nanocomposite Material

The $MoS_x$/carbon black nanocomposite material was prepared under the conditions of Example 1 except that the mass of ammonium tetrathiomolybdate in Example 1 was altered to 300 mg. The mass percentage of $MoS_x$ was about 35%, the content of 1T component was about 50%, and atomic ratio of Mo to S is 1:2.08.

Example 9: Preparation of $MoS_x$/Carbon Black Nanocomposite Material

The $MoS_x$/carbon black nanocomposite material was prepared under the conditions of Example 1 except that the mass of ammonium tetrathiomolybdate in Example 1 was altered to 400 mg. The mass percentage of $MoS_x$ was about 45%, the content of 1T component was about 50%, and atomic ratio of Mo to S is 1:2.08.

Example 10: Preparation of $MoS_x$/Carbon Black Nanocomposite Material

The $MoS_x$/carbon black nanocomposite material was prepared under the conditions of Example 1 except that the reaction time in Example 1 was altered to 18 hours. $MoS_x$ has a more disordered structure. The mass percentage of $MoS_2$ was about 20%, the content of 1T component was about 60%, and atomic ratio of Mo to S is 1:2.16.

Example 11: Preparation of $MoS_x$/Carbon Black Nanocomposite Material

The $MoS_x$/carbon black nanocomposite material was prepared under the conditions of Example 1 except that the reaction time in Example 1 was altered to 30 hours. $MoS_x$ has a more orderly structure. The mass percentage of $MoS_2$ was about 28%, the content of 1T component was about 40%, and atomic ratio of Mo to S is 1:2.05.

Example 12: Preparation of $MoS_x$/Carbon Black Nanocomposite Material

The $MoS_x$/carbon black nanocomposite material was prepared under the conditions of Example 1 except that the reaction temperature in Example 1 was altered to 180° C. The mass percentage of $MoS_x$ was about 20%, the content of 1T component was about 40%, and atomic ratio of Mo to S is 1:2.19.

Example 13: Preparation of $MoS_x$/Carbon Black Nanocomposite Material

The $MoS_x$/carbon black nanocomposite material was prepared under the conditions of Example 1 except that the reaction temperature in Example 1 was altered to 200° C. The mass percentage of $MoS_x$ was about 22%, the content of 1T component was about 40%, and atomic ratio of Mo to S is 1:2.14.

Example 14: Preparation of $MoS_x$/Carbon Black Nanocomposite Material

The $MoS_x$/carbon black nanocomposite material was prepared under the conditions of Example 1 except that the reaction temperature in Example 1 was altered to 240° C. The mass percentage of $MoS_x$ was about 32%, the content of 1T component was about 40%, and atomic ratio of Mo to S is 1:2.03.

Example 15: Preparation of $MoS_x$/Carbon Black Nanocomposite Material

The $MoS_x$/carbon black nanocomposite material was prepared under the conditions of Example 1 except that 200 mg ammonium tetrathiomolybdate in Example 1 was replaced by 200 mg ammonium molybdate and 150 mg thiourea. The mass percentage of $MoS_x$ was about 30%, the content of 1T component was about 50%, and atomic ratio of Mo to S is 1:2.06.

The catalytic performance for electrocatalytic hydrogen evolution reaction of $MoS_x$/carbon black nanocomposite material prepared in Examples 2-15 was tested according to the method and test conditions described in Example 1. The results are recorded in Table 1 together with the test results in Example 1.

TABLE 1

Comparison of catalytic performance of the $MoS_x$/carbon black nanocomposite material prepared in Examples 1-15

| Examples | Catalyst loading (mg/cm$^2$) | Initial overpotential $\eta$(mV) | Current density j(mA/cm$^2$) | Corresponding overpotential$^a$ $\eta$(mV) | Current density at $\eta$ = 300 mV j (mA/cm$^2$) | Tafel slope (mV/dec) |
|---|---|---|---|---|---|---|
| Example 1 | 0.275 | 80 | 10 | 127 | 451 | 46 |
| Example 2 | 0.275 | 84 | 10 | 130 | 440 | 46 |
| Example 3 | 0.275 | 84 | 10 | 132 | 445 | 46 |
| Example 4 | 0.275 | 80 | 10 | 124 | 465 | 46 |
| Example 5 | 0.275 | 87 | 10 | 135 | 420 | 46 |
| Example 6 | 0.275 | 91 | 10 | 136 | 402 | 50 |
| Example 7 | 0.275 | 95 | 10 | 144 | 320 | 54 |
| Example 8 | 0.275 | 90 | 10 | 137 | 407 | 50 |
| Example 9 | 0.275 | 93 | 10 | 139 | 362 | 51 |
| Example 10 | 0.275 | 86 | 10 | 131 | 418 | 50 |
| Example 11 | 0.275 | 97 | 10 | 139 | 382 | 55 |
| Example 12 | 0.275 | 105 | 10 | 156 | 319 | 59 |
| Example 13 | 0.275 | 101 | 10 | 148 | 357 | 56 |
| Example 14 | 0.275 | 102 | 10 | 149 | 352 | 56 |
| Example 15 | 0.275 | 98 | 10 | 145 | 373 | 55 |

$^a$the corresponding overpotential refers to the overpotential when the current density is 10 mA/cm$^2$ as listed in previous column; mV/dec represents the value of the change in potential when the current density changes by an order of magnitude, and dec is the abbreviation of decade.

Comparative Examples 1-11

11 kinds of catalysts for electrocatalytic hydrogen evolution reaction were prepared according to the description of the references in Table 2. The performance for electrocatalytic hydrogen evolution reaction of the 11 kinds of catalysts prepared in Comparative Examples 1-11 were tested. The test results are shown in Table 2. The references in Table 2 are incorporated herein by reference in their entireties, which are not repeated in this application.

The references in Table 2 are as follows:
1, Xie J., Zhang H., Li S., Wang R., Sun X., Zhou M., Zhou J., Lou X., Xie Y *Advanced Materials* 2013, 25 (40), 5807-5813.
2, Benck J. D., Chen Z., Kuritzky L. Y, Forman A. J., Jaramillo T. F. *ACS Catalysis* 2012, 2 (9), 1916-1923.
3, Lukowski M. A., Daniel A. S., Meng F., Forticaux A., Li L., Jin S., *Journal of the American Chemical Society* 2013, 135 (28), 10274-10277.
4, Benson J., Li M., Wang S., Wang P., Papakonstantinou P. *ACS Applied Materials & Interfaces* 2015, 7 (25), 14113-14122.

TABLE 2

Comparison of catalytic performance of the catalysts prepared in Comparative Examples 1-11

| | Catalyst | Catalyst loading (mg/cm$^2$) | Initial overpotential $\eta$(mV) | Current density j(mA/cm$^2$) | Corresponding overpotential$^a$ $\eta$(mV) | Current density at $\eta$ = 300 mV j (mA/cm$^2$) | Tafel slope (mV/dec) | References |
|---|---|---|---|---|---|---|---|---|
| Comparative Example 1 | defect-abundant $MoS_2$ | 0.285 | 120 | 13 | 200 | ~80 | 50 | 1 |
| Comparative Example 2 | amorphous $MoS_2$ | / | 150 | 10 | ~200 | <100 | ~60 | 2 |
| Comparative Example 3 | IT $MoS_2$ | / | / | 10 | 195 | 150 | 54 | 3 |
| Comparative Example 4 | $MoS_2$ with few layers | 0.285 | 90 | 10 | 248 | 20 | 61 | 4 |
| Comparative Example 5 | 2H-$MoS_2$ | 0.205 | 112 | 10 | 214 | 55 | 74 | 5 |
| Comparative Example 6 | $MoS_2$/rGO | 0.285 | ~100 | 10 | ~155 | ~120 | 41 | 6 |
| Comparative Example 7 | GA-$MoS_2$ | 0.56 | ~100 | 10 | 165 | / | 41 | 7 |
| Comparative Example 8 | $MoS_2$ with high curvature | / | 130 | 10 | ~230$^b$ | <30 | 50$^b$ | 8 |
| Comparative Example 9 | $MoS_2$/Au | / | 90 | 10 | ~225 | <50 | 69 | 9 |
| Comparative Example 10 | Au/$MoS_2$ | 0.275 | 120 | 10 | ~260 | 30 | 71 | 10 |
| Comparative Example 11 | $MoS_2$/rGO | 0.20 | 140 | 10 | ~180 | ~130 | 41 | 11 |

$^a$the corresponding overpotential refers to the overpotential when the current density is essentially 10 mA/cm$^2$ as listed in previous column.
$^b$these data have been processed by iR-correction.

5, Guo B., Yu K., Li H., Song H., Zhang Y., Lei X., Fu H., Tan Y, Zhu Z. *ACS Applied Materials & Interfaces* 2016, 8 (8), 5517-5525.
6, Li Y, Wang H., Xie L., Liang Y, Hong G., Dai H. *Journal of the American Chemical Society* 2011, 133 (19), 7296-7299.
7, Zhao Y, Xie X., Zhang J., Liu H., Ahn H., Sun K., Wang G *Chemistry—A European Journal* 2015, 21 (45), 15908-15913.
8, Kibsgaard J., Chen Z., Reinecke B. N., Jaramillo T. F. *Nature Materials* 2012, 11(11), 963-969.
9, Wang T., Liu L., Zhu Z., Papakonstantinou P., Hu J., Liu H., Li M. *Energy & Environmental Science* 2013, 6 (2), 625-633.
10, Shi Y Wang J., Wang C., Zhai T., Bao W., Xu J., Xia X., Chen H. *Journal of the American Chemical Society* 2015, 137 (23), 7365-7370.
11, Zheng X., Xu J., Yan K., Wang H., Wang Z., Yang S. *Chemistry of Materials* 2014, 26 (7), 2344-2353.

By comprehensively analyzing Table 1 and Table 2, it can be known that the $MoS_x$/carbon black nanocomposite material prepared in the examples of the present application, when used as a catalyst for electrocatalytic hydrogen evolution reaction, not only reduces the aggregation behavior of the molybdenum disulfide material due to the carbon black material as a carrier, but also increases the conductivity of the material due to the high electrical conductivity of the carbon black material, and enhances the intrinsic catalytic performance of molybdenum disulfide due to the chemical interaction between the carbon black material and molybdenum disulfide, thereby resulting in an excellent catalytic performance of the composite material. The prepared composite material has a low tafel slope and initial overpotential, and has a large current density at a lower overpotential. For example, when the materials prepared in Examples 1-15 of the present application are used as catalysts, although the initial overpotential of Examples 12-14 is slightly higher than 100 mV, the initial overpotential of other examples is below 100 mV, and the minimum can reach 80 mV. The overpotential at 10 $mA/cm^2$ is slightly higher than 150 mV in Example 12, but below 150 mV in other examples. The current density at an overpotential of 300 mV is above 300 $mA/cm^2$, and many examples can reach 400 $mA/cm^2$ or more. With respect to the catalyst prepared in Comparative Examples 1-11, not only the preparation method thereof is more complicate, but also the cost of material preparation is higher. Further, the catalytic performance is limited, which is far from meeting the performance required for practical industrial applications. When the materials prepared in Comparative Examples 1-11 are used as catalysts, the most of initial overpotential are more than 100 mV. Even if some of initial overpotential are lower than 100 mV, the other performance indexes are largely inferior to that of the present application. For example, although the catalyst prepared in Comparative Example 9 has an initial overpotential of 90 mV, it also has an overpotential of 225 mV at 10 $mA/cm^2$, which is much higher than that in the examples of the present application; and it has a current density of below 50 $mA/cm^2$ at an overpotential of 300 mV, which is much lower than that in the examples of the present application. Further, when the materials prepared in Comparative Examples 1-11 are used as catalysts, the overpotential at 10 $mA/cm^2$ is significantly higher than that in the examples of the present application, and the current density at an overpotential of 300 mV is also significantly lower than that in the examples of the present application. It can be seen that the $MoS_x$/carbon black nanocomposite materials provided by the present application are prepared by a simpler method, lower in cost, and have more excellent catalytic performance than the catalysts prepared in Comparative Examples 1-11, and can meet industrial production requirements.

The above description is only the preferred examples of the present application, and is not intended to limit the present application. Any modifications, equivalent substitutions, improvements, etc., which are made within the spirit and principles of the present application, should be included within the scope of protection of the present application.

The invention claimed is:

1. A $MoS_x$/carbon black nanocomposite material, wherein $2.01 \leq x \leq 2.20$ and $MoS_x$ accounts for 5-50% in mass based on the total mass of the nanocomposite material.

2. The nanocomposite material of claim 1, wherein in the nanocomposite material, $MoS_x$ as a layered structure is dispersed in carbon black, and $MoS_x$ comprised in an aggregate formed by the layered structure has 10 layers or less.

3. The nanocomposite material of claim 1, wherein $MoS_x$ comprises both a 1T structure and a 2H structure.

4. A method for preparing the nanocomposite material according to claim 1, comprising:
   (1) dispersing carbon black in water to obtain a carbon black dispersion;
   (2) adding a sulfur source and a molybdenum source to the carbon black dispersion to obtain a mixed solution; and
   (3) subjecting the mixed solution to a hydrothermal reaction at a temperature of 180-240° C. for 15-30 hours; and obtaining the nanocomposite material by separation and drying after completion of the reaction.

5. The method for preparing the nanocomposite material of claim 4, wherein
   the sulfur source and the molybdenum source come from the same compound, and the compound is present in the mixed solution at a concentration of 1-10 mg/mL; or
   the sulfur source and the molybdenum source come from different compounds, wherein the sulfur source is present in the mixed solution at a concentration of 2-40 mg/mL, and the molybdenum source is present in the mixed solution at a concentration of 1-10 mg/mL.

6. The method for preparing the nanocomposite material of claim 4, wherein a ratio of carbon black to water is 1-16 mg:1 mL, and the carbon black is at least one selected from the group consisting of acetylene black and Ketjen black.

7. A method of conducting an electrochemical hydrogen evolution reaction comprising utilizing the $MoS_x$/carbon black nanocomposite material according to claim 1 in conducting the electrochemical hydrogen evolution reaction.

8. A cathode electrode comprising a base electrode and the $MoS_x$/carbon black nanocomposite material according to claim 1 coated on a surface of the base electrode, wherein the base electrode is an inert electrode.

9. A device for hydrogen production by water electrolysis comprising the cathode electrode according to claim 8.

10. A hydrogen fuel cell device comprising a hydrogen fuel cell body and the device for hydrogen production by water electrolysis according to claim 9.

11. An electric equipment comprising the hydrogen fuel cell device according to claim 10.

12. The nanocomposite material of claim 1, wherein in the nanocomposite material, $MoS_x$ as a layered structure is dispersed in carbon black, and $MoS_x$ comprised in an aggregate formed by the layered structure has 8 layers or less.

13. The nanocomposite material of claim 3, wherein 40-60% of $MoS_x$ has the 1T structure.

14. The method for preparing the nanocomposite material of claim 4, wherein the carbon black is dispersed by sonication for 10-30 minutes.

15. The method for preparing the nanocomposite material according to claim 5, wherein the sulfur source and the molybdenum source come from the same compound, and the compound is selected from the group consisting of ammonium tetrathiomolybdate and sodium tetrathiomolybdate.

16. The method for preparing the nanocomposite material according to claim 5, wherein the sulfur source and the molybdenum source are from different compounds, the sulfur source is at least one selected from the group consisting of thiourea and sodium thiosulfate, and the molybdenum source is at least one selected from the group consisting of ammonium molybdate, molybdenum pentachloride, and sodium molybdate.

17. The cathode electrode of claim 8, wherein the base electrode is selected from the group consisting of a glassy carbon electrode, a graphite electrode, an ITO electrode, and an FTO electrode.

18. The electric equipment of claim 11, wherein the electric equipment is an electric vehicle, an electric tricycle, or an electric bicycle.

19. The electric equipment of claim 18, wherein the electric vehicle is an electric tricycle or an electric bicycle.

* * * * *